H. W. BARSON.
COIN CONTROLLED WEIGHING SCALE.
APPLICATION FILED APR. 22, 1913.
1,122,244.
Patented Dec. 29, 1914.
3 SHEETS—SHEET 3.
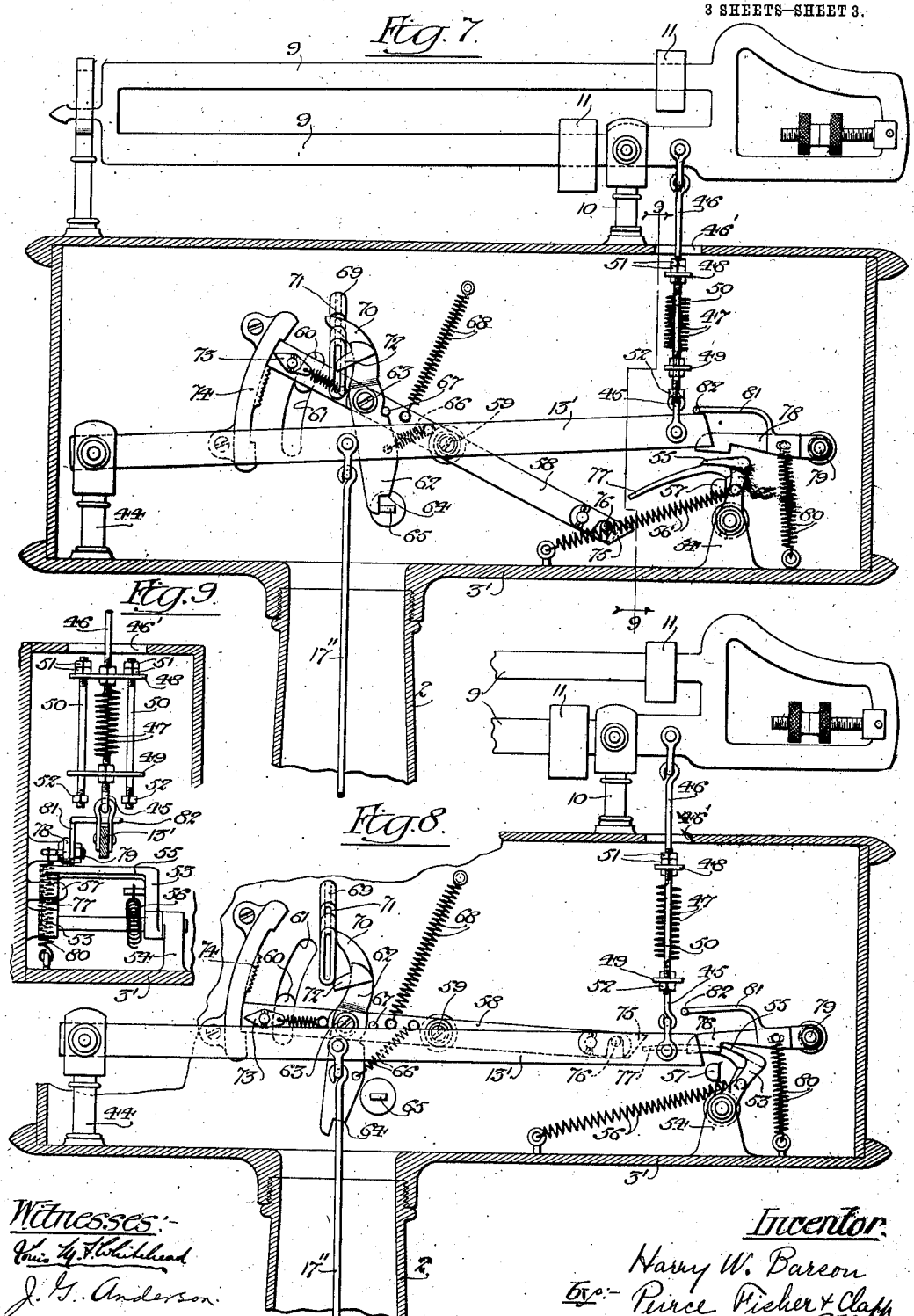
Witnesses:
Louis H. Whitehead
J. G. Anderson
Inventor:
Harry W. Barson
by Pierce, Fisher & Clapp
Attys

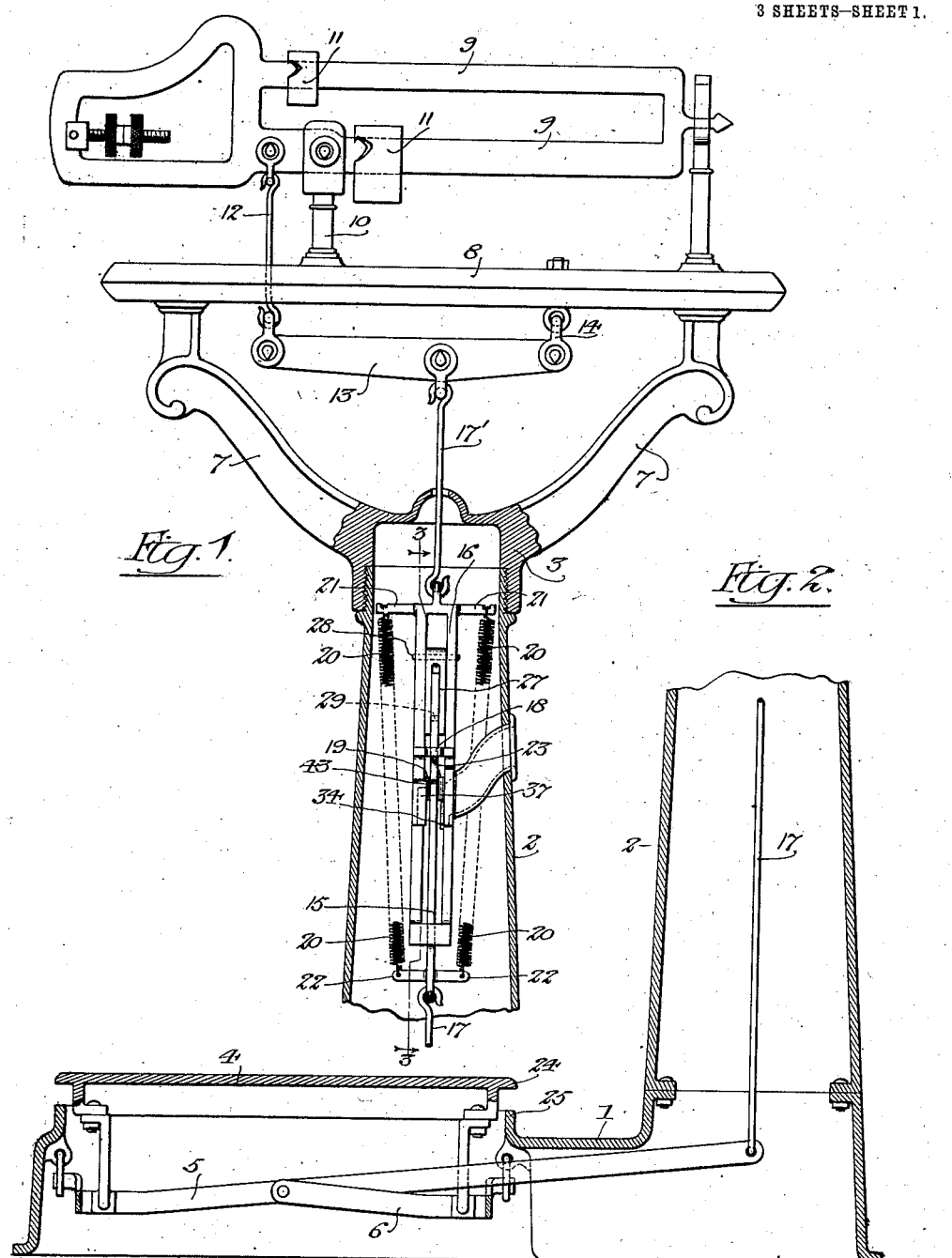

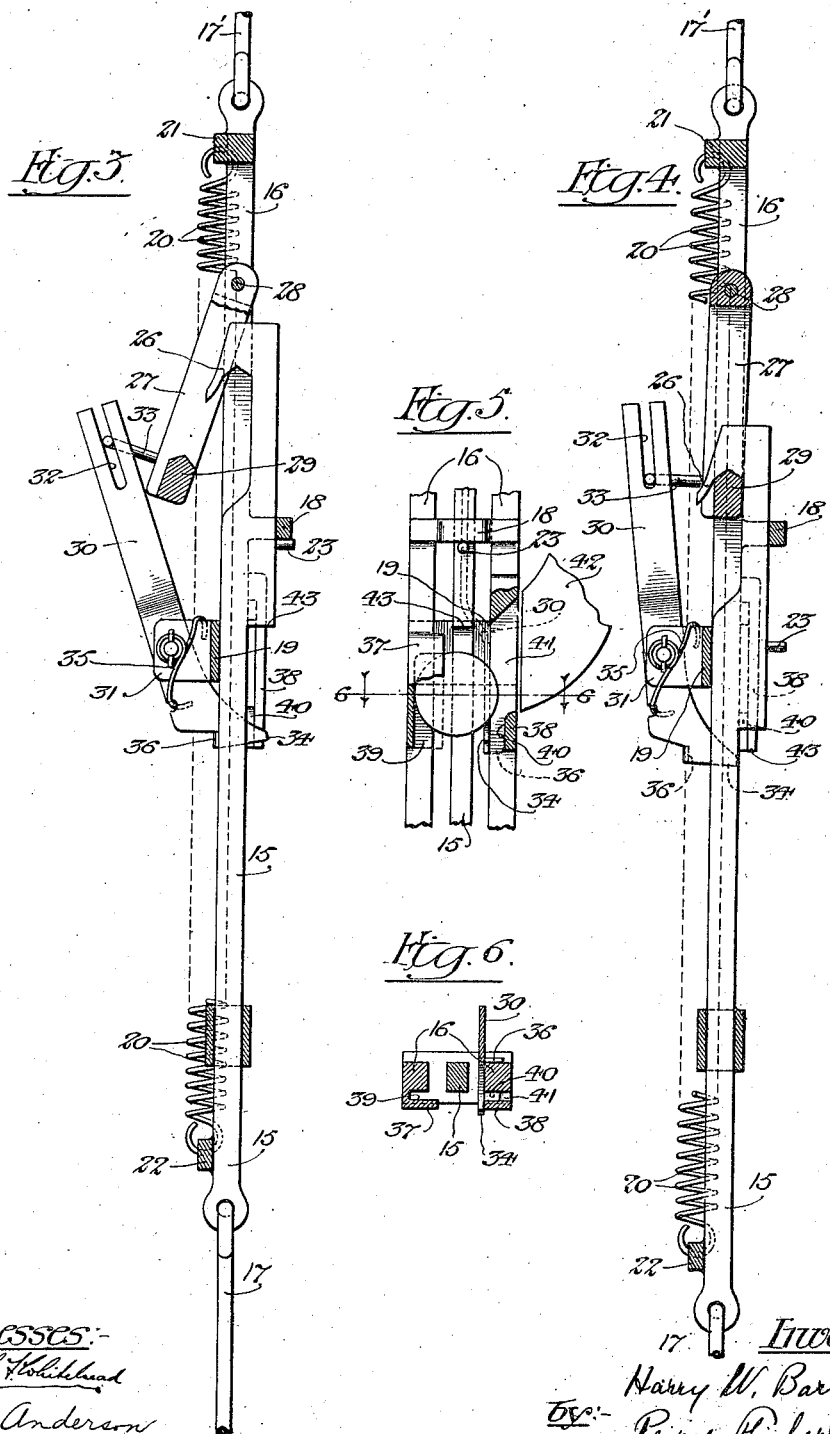

UNITED STATES PATENT OFFICE.

HARRY W. BARSON, OF CHICAGO, ILLINOIS.

COIN-CONTROLLED WEIGHING-SCALE.

1,122,244.   Specification of Letters Patent.   Patented Dec. 29, 1914.

Application filed April 22, 1913. Serial No. 762,812.

*To all whom it may concern:*

Be it known that I, HARRY W. BARSON, a citizen of the United States, and a resident of Chicago, county of Cook, and State of Illinois, have invented certain new and useful Improvements in Coin-Controlled Weighing-Scales, of which the following is a full, clear, and exact description.

The invention relates to controlled weighing scales and of that type in which the weight placed upon the platform of the scales is determined by a counter-balancing weighing beam.

The invention seeks to provide simple and effective means whereby scales of this kind can be coin controlled, and consists in the features of improvement hereinafter set forth, illustrated in the preferred form in the accompanying drawings and more particularly pointed out in the appended claims.

Figure 1 is an elevation of the upper portion of the scales with the standard shown in section. Fig. 2 is a lower vertical portion of the scales. Fig. 3 is a detailed section of the coin-controlled parts taken on the line 3—3 of Fig. 1. Fig. 4 is a similar view showing the parts in shifted position. Fig. 5 is a partial view in front elevation of the coin controlled parts. Fig. 6 is a detailed section on the line 6—6 of Fig. 5. Fig. 7 is a vertical section of the upper portion of a modified form. Fig. 8 is a similar view showing the parts in shifted position. Fig. 9 is a detail section on the line 9—9 of Fig. 7.

In its preferred form, the improvement is of such a nature that it can be readily applied to platform scales of the usual type. As shown, the frame of the scales comprises a base 1, a hollow standard 2 extending upwardly from one end of the base and a head 3 mounted on the upper end of the standard. A platform 4 is arranged above an opening in the base 1 and is mounted in suitable manner upon weighing levers 5 and 6 of ordinary construction, the rear end of the weighing lever 5 being arranged below the lower end of the hollow standard 2. The head 3 is provided with branching arms 7 connected at their upper ends by a cross-bar 8. The balancing beam 9 is pivotally mounted upon a standard 10 rising from the cross bar 8. In the form shown, the balancing beam is double and each portion thereof is provided with a sliding counterpoise.

Adjacent its pivoted end the beam 9 is connected by a link 12 to one end of a lever 13 arranged below the bar 8, the opposite end of the lever 13 having a pivotal connection 14 with this bar. The parts thus far described may be of any usual or suitable construction.

In accordance with the present invention, the platform is normally connected to the balancing beam through the medium of a yielding connection or spring, so that the beam cannot be used to counterbalance and determine a weight of any considerable amount placed upon the platform. For this purpose a normally inoperative, yielding connection is interposed at any suitable point between the platform and the balancing beam and coin operated or controlled means are provided for effecting or controlling a positive connection between the platform and the beam.

In the construction shown in Figs. 1 to 6, the yielding inoperative connection is interposed between the weighing lever 5 within the base of the frame and the lever 13 which is connected to the balancing beam, but it should be understood that the yielding connection can be otherwise arranged without departure from the scope of the invention.

In the construction shown in Figs. 1 to 6, the coin controlled parts are arranged within the upper portion of the hollow standard 2, and comprise two relatively slidable members 15 and 16 connected respectively by links 17 and 17' to the levers 5 and 13. The member 16 comprises a narrow rectangular frame, and the member 15 comprises a rod which is arranged to slide longitudinally through an opening or guide-way in the lower end bar of the frame member 16. The upper end of the rod 15 is held in position between two cross-pieces 18 and 19 that extend between the side bars of the frame member 16. The upper ends of a pair of light coiled springs 20 are connected to laterally projecting lugs 21 on the upper end of the frame members 16, and the lower ends of the springs are connected to laterally projecting lugs 22 on the lower end of the rod 15. These springs hold the parts or members 15 and 16 in normal position with a stop pin 23 on the rod 15 engaging the cross-piece 18 of the frame member 16. The springs 20 are sufficiently strong to normally uphold the weighing platform 4, but if a person steps upon the platform, the springs are stretched and the members 15 and 16 slide relatively to one another, so that the force exerted by a person or other body of considerable weight on the platform is not properly transmitted to the weighing beam and the weight cannot be determined. A suitable stop device is employed for limiting this downward movement of the platform and the parts connected thereto. In the form shown, the platform is provided with a projecting edge flange 24 which is arranged to engage a flange or shoulder 25 formed on the base. With this arrangement, when a body of any considerable weight is placed on the platform, the latter is depressed and through the medium of the weighing lever 5 and link 17, the rod 15 is pulled down and the springs 20 stretched until the edge of the platform engages the flange or shoulder 25 on the base 1. While the springs 20 then, of course, exert a pull upon the balancing beam 9, it is not commensurate with the weight of the body on the platform and the scales cannot be employed to determine the weight. The relatively movable members 15 and 16 are provided with parts or suitable means which can be coin controlled, whereby these members may be engaged to positively connect the platform and the balancing beam, so that the latter may be used to determine the weight of the body placed upon the platform. This engagement of the relatively sliding members may be effected in different ways without departure from the scope of the invention. In the preferred form shown, the rod 15 is provided at its upper end with a rigid hook 26 which is arranged to coöperate with a latch 27 pivotally mounted upon the frame member 16. As shown, the latch 27 is arranged between the side bars of the frame member 16 and is connected at its upper end to these bars by a pivot pin 28. The latch itself comprises side bars connected at their lower ends by a cross-bar 29, the upper edge of which is preferably beveled, as shown. A trip 30 for the latch is pivotally mounted between its ends on a lug 31 that projects rearwardly from the cross-piece 19 of the frame member 16. This trip is provided with a slot 32 at its upper end which is engaged by a hook 33 that projects from the catch member 27. The trip 30 is provided at its lower end with a toe portion 34 which extends between one of the side bars of the frame member 16 and the rod 15. A spring 35, coiled about the pivot of the trip, normally holds it and the latch 27 in the position shown in Fig. 3, with a stop lug 36 on the trip engaging one of the side bars of the frame member 15. Immediately above the normal position of the projecting toe 34 of the trip 30 and on the side of the device opposite the trip 30 and catch 27, the side bars of the member 16 are provided with raised portions 37 and 38 which are provided with vertical guide grooves 39 and 40. The part 38 is also provided with a slot 41 opening into the guide groove 40 thereof. In the normal position of the parts the slot 41 is opposite the inner end of a coin chute 42 which is mounted on the standard 2 and opens at any convenient point on the exterior thereof. At a point adjacent the upper end of the slot 41 the rod 15 is provided with a shoulder 43.

Normally the parts are in the position shown in Figs. 1 and 3. If a body is placed on the platform 40 without depositing a coin in the chute 42, the weight of the body, if sufficient to overcome the tension of the light springs 20 will merely depress the platform 4 until it engages the stop flange 25 and the force exerted by the weight of the body will not be properly transmitted to the balancing beam 9. If a coin is placed in the chute before the body whose weight is to be determined is placed on the platform, it passes through the slot 41 of the part 38 into the position shown in Fig. 5 in the guide grooves 39 and 40 of the parts 37 and 38 of the member 16 and below the shoulder 43 of the member 15. The coin is upheld in this position by the toe 34 of the trip 30. If the body is then placed on the platform, the downward movement of the rod 15 will bring the shoulder 43 thereon in engagement with the upper edge of the coin, and the latter will be pressed against the toe 34 of the trip 30. If the body is then placed on the platform, the downward movement of the rod 15 will bring the shoulder 43 thereon in engagement with the upper edge of the coin, and the latter will be pressed against the toe 34 of the trip 30, so that the trip and the catch 27 are shifted against the tension of the spring 35 to bring the cross-bar 29 of the latch below the hook 26 on the rod 15. The continued downward movement of the rod will engage the hook with the cross-bar, as shown in Fig. 4, to thereby interlock the relatively sliding members 15 and 16 and positively connect the platform 4 with the scale beam 9. The weight of the person or thing on the platform can then be determined. As stated, the downward movement of the bar 15 when a coin is placed in the machine, first, through the medium of the coin shifts the trip 30 and latch 27, and the further movement of the rod interlocks the hook 26 with the bar 29 of the latch 27. This further movement of the rod 15 also pushes the coin past the toe 34 so that it is released and falls down inside of the standard 2 into a receptacle placed at any suitable point to receive it. The members 15 and 16, however, remain interlocked until the body on the weighing platform 4 is removed. When this occurs, the springs 20 disengage the hook 26 and bar 29 and the spring 35 then shifts the latch to its inoperative position shown in Fig. 3. It should be noted that the springs 20, which may properly be termed restoring springs, must be of sufficient strength to counterbalance the platform 4 when the latter is unweighted, otherwise they will not hold the relatively sliding members 15 and 16 in proper normal position and will not serve to restore the same to such position. Obviously, the coöperating stops 24 and 25, which, in the preferred form shown, limit the downward movement of the platform when the members 15 and 16 are disconnected, must be so arranged that they will not be in engagement when these members are interlocked.

In the form shown in Figs. 7, 8 and 9, the head 3' at the upper end of the standard 2 is enlarged to form a hollow rectangular casing. A lever 13' corresponding to the lever 13 in the form shown in Fig. 1, is arranged within the head or casing 3' and is pivotally mounted at one end on a post 44. The balancing beam 9 is similar to that previously described. In this form, the normally inoperative, yielding connection is interposed between the balancing beam 9 and the lever 13' and the latter is directly connected to the weighing levers in the base of the scales by a link 17''. The yielding, normally inoperative connection comprises two rods or members 45 and 46 connected respectively to the outer end of the lever 13' and to the balancing beam adjacent its pivoted end. The latter rod or member extends through an opening 47 in the upper end of the head or casing 3'. The ends of the rods or members 45 and 46 are connected by a spring 47. A lost-motion connection also extends between these members and comprises crossbars 48 and 49 connected to the ends of the members, and rods 50 extending through perforations in the ends of the cross-pieces 48 and 49 and provided at their upper and lower ends with adjustable nuts or abutments 51 and 52. Normally, the nuts or abutments 52 are spaced from the under side of the cross-piece 49 on the member 45, as shown in Figs. 7 and 9.

When a weight is placed upon the platform of the scales, the lever 13' is depressed and pulls down the rod or member 45 and cross-bar 49 thereon. But unless the coin controlling mechanism is actuated, the lever 13' is arrested by a suitable stop device before the cross-bar 49 engages the nuts or abutments 52 on the lower ends of the rods 50. This stop comprises a swinging arm 53 pivotally mounted upon a bracket 54 on the bottom of the casing 3' and having a part 55 projecting beneath the end of the lever 13'. A spring 56 is connected at one end to the stop member 53 at the opposite end of the casing. This spring normally holds the stop member in the position shown in Fig. 7 with the latter engaging a lug 57 that projects inwardly from the side wall of the casing 3'. As stated, the force exerted by a weight sufficient to overcome the spring 47 draws the lever 13' down until it engages the stop 53 and thereby stretches the yielding connection or spring 47 between the lever and the balancing beam, but inasmuch as the lost-motion between the parts 49 and 52 is not taken up, the lever 13' and balancing beam 9 are not properly connected and the weight cannot be determined. Suitable coin controlled mechanisms are provided for shifting the stop 53 to permit the further movement of the lever and the member 45 connected thereto to thereby bring the cross-bar 49 in engagement with the abutments 52 to positively engage or connect the members 45 and 46 and thereby properly transmit the pull from the lever 13' to the balancing beam 9.

In the construction shown, the coin controlled mechanism comprises a lever 58 arranged in the casing and pivotally mounted at 59 to the side wall thereof. A handle 60 on the outer end of the lever extends through a segmental slot 61 in the front wall of the casing, so that it may be employed by the user to depress the left hand end of the lever and raise the right hand end thereof. This movement of the lever is normally checked by a dog 62 pivotally connected at 63 to the lever. The lower end of the dog is provided with a shoulder 64 which, when the left hand end of the lever is depressed, is arranged to engage a stop lug 65 projecting inwardly from the side of the casing. A spring 66 extends between the dog 62 and the lever 58 and holds the dog in normal position against a stop pin 67 on the lever. The lever 58 itself is held in normal position by a spring 68 connected to the lever and to the wall of the casing. This spring normally holds the lever in the position shown in Fig. 2 with the laterally projecting arm or handle 60 thereon at the upper end of the slot 61. A coin chute 69 projects inwardly from the front wall of the casing 3' over the left hand end of the lever. An arm 70 on the upper end of the dog 62 extends over the coin chute and above a slot 71 therein. Another arm 72 on the dog normally extends over the open inner end of the chute. The movement of the lever 58 is also controlled by a spring-held, full stroke dog 73 pivotally mounted on its left hand end and arranged to coöperate with the ratchet teeth on a segment 74.

The free end of the lever is provided with a pivoted dog 75 which is normally held by gravity against the stop pin 76 on the lever. When the lever 58 is shifted, the dog 75 thereon is arranged to engage a projecting arm 77 on the stop member 53 and shift the latter out of the path of the lever 13', as shown in Fig. 8. The stop member 53 is held in shifted position by a latch 78 which is pivotally mounted on an upright 79 rising from the base of the casing 3' and is connected to the upright 79 by a spring 80. An arm 81 on the latch 78 is provided with a laterally projecting end portion 82 which extends over the end of the lever 13'. The spring 80 holds the latch in normal position with the part 82 resting on the lever 13'.

When a body of any considerable weight is placed on the platform, the lever 13' is depressed until it engages the forwardly projecting part 55 of the stop member 53. By thus arresting the lever 13', the force exerted by the body on the platform is not properly transmitted to the balancing beam 9 and its weight cannot be determined. If a coin is placed in the chute 69, it will be held in position near the inner open end of the chute by the arm 72 on the locking dog 62. In this position, the arm 70 on the upper end of the locking dog extends over the coin. The user of the machine then depresses the operating handle 60 to move the left hand end of the lever 58 downwardly. This brings the arm 70 on the upper end of the locking dog against the upper edge of the coin, so that the upper end of the dog is swung to the right and its lower end to the left clear of the stop lug 65. The shift of the lever can then be continued until the handle reaches the lower end of the slot 61. During this movement, the dog 75 on the right hand end of the lever 58 engages the arm 77 and swings the stop 53 out of the path of movement of the lever or into the position shown in Fig. 8. The latch 78 then engages the stop member 53 and holds it in inoperative position. The weight on the platform of the scales then further depresses the lever 13' and rod 45 connected thereto until the cross-piece 49 engages the nuts or abutments 52 on the lower ends of the rods 50. The lever 13' and balancing beam 9 are then properly connected so that the weight of the person or body on the scales of the platform can be properly determined. When the weight of the person or body is removed from the platform scales, the parts are returned to normal position. The spring 47 draws the lever 13' upwardly and moves its free end against the part 82 so that the latch 78 is lifted and the stop member 53 is returned to normal position with the part 55 thereon beneath the end of the lever 13'.

It should be noted that, at the end of the downward movement of the locking dog 62 (shown in Fig. 8), the arm 72 is removed from the inner open end of the coin slot 69, so that the coin drops out of the chute into a suitable receptacle placed to receive it. The full stroke dog 73 compels the complete shift of the lever 58 in one or the other direction. It should also be noted that in each form, a normally yielding connection is interposed between the platform and the weighing beam, so that these parts are not properly connected to transmit the force exerted by weight on the platform to the balancing beam if the weight is heavy enough to overcome the yielding connection or spring, and that coin controlled mechanism is provided for effecting a positive operative connection between the platform and balancing beam. It should be further noted that the yielding device or spring, which serves to restore the connections between the platform and the balancing beam to normal inoperative condition, is not interposed between such connections in a fixed point on the frame, but is interposed in the connections themselves and is freely and bodily movable therewith, so that it does not interfere with the proper counterbalancing of a weight placed on the platform after the connections have been rendered inoperative. Furthermore, no other spring is interposed between the moving parts of the frame or casing which would tend to restrict the movement of the parts and the proper operation thereof and the amount of weight placed on the platform is determined by a counterbalancing beam and not by the variable stretching or compressing of a spring.

It is obvious that numerous changes may be made in the details set forth without departure from the essentials of the invention as defined in the claims.

I claim as my invention:—

1. In a scale, a normally inoperative weighing mechanism comprising a platform, a counter-balancing weighing beam therefor, coin controlled means for controlling the positive connection of said platform to said beam to thereby render the weighing mechanism operative, and a yielding device connected to said platform and to said beam for restoring the weighing mechanism to normal inoperative condition.

2. In a weighing scale, the combination of a platform, a counterbalancing beam therefor, connections between said beam and said platform, a spring interposed in said connections and freely and bodily movable therewith, said connections having parts adapted to be engaged to positively connect said platform and said beam independently of said spring, and coin-actuated means controlling the operative engagement of said parts.

3. In a weighing scale, the combination of a platform, a counterbalancing beam therefor, two relatively movable members connected respectively to said beam and to said platform, said members having parts adapted to be engaged to positively connect said beam and said platform, coin-controlled means normally preventing the operative engagement of said parts, said means being operable through the medium of a coin to permit the engagement of said parts, and a yielding connection between said members and freely and bodily movable therewith for restoring the same to normal, inoperative condition.

4. In a weighing scale, the combination with a frame, of a platform, weighing levers whereon said platform is mounted, a pivoted beam for counterbalancing a weight on said platform, normally inoperative, lost motion connections between said levers and said beam having parts adapted to be engaged to render said connections operative, coin-controlled means for controlling the engagements of said parts and a spring interposed in said connections and freely and bodily movable therewith for restoring the same to normal, inoperative condition.

5. In a weighing scale, the combination with a frame, of a platform, weighing levers whereon said platform is mounted, a balancing beam, two relatively movable members connected respectively to said beam and to said weighing levers, coin-controlled means for controlling the operative engagement of said members, and a yielding device connected to both of said members for disengaging the same.

6. In a weighing scale, the combination of a platform, a pivoted counterbalancing beam therefor, normally inoperative, lost motion connections between said beam and said platform, said connections having parts adapted to be engaged to positively connect said platform to said beam, coin-actuated mechanism controlling the engagement of said parts, and a yielding device interposed in said connections and freely and bodily movable therewith for disengaging said parts.

7. In a weighing scale, the combination with a platform, a counterbalancing weighing beam therefor, normally inoperative lost motion connections between said platform and said beam, said connections having parts adapted to be engaged to positively connect said platform and said beam, a stop device normally preventing the engagement of said parts, coin-controlled means for releasing said stop device, and means for counterbalancing the unweighted platform and for restoring said connections to normal, inoperative condition.

8. In a weighing scale, the combination with a platform, of a counterbalancing weighing beam therefor, normally inoperative connections between said beam and said platform including a yielding device connected both to said platform and said beam and freely and bodily movable with said connections, said connections having parts adapted to be engaged to positively connect said platform and said beam independently of said yielding device, a stop normally preventing the engagement of said parts, and coin-controlled means for releasing said stop.

9. In a weighing scale, the combination with a platform, of a counterbalancing weighing beam, coöperating movable parts connected respectively to said platform and to said beam, a yielding spring connecting said parts and freely and bodily movable therewith, a stop device for preventing the operative movement of said parts, and coin-controlled mechanism for releasing said stop device, said spring being arranged to restore said parts to normal condition.

10. In a weighing scale, the combination with a platform, of a counterbalancing weighing beam therefor, coöperating members connected respectively to said beam and to said platform and having a lost motion engagement, a stop device normally preventing the operative engagement of said connecting members, coin-controlled means for releasing said stop device, and means for counterbalancing the unweighted platform and for restoring said connections and said stop device to normal position.

11. In a weighing scale, the combination with a platform, a counterbalancing weighing beam therefor, coöperating members connected respectively to said beam and to said platform and having a lost motion connection, a stop device normally preventing the operative movement of said connecting members, coin-controlled means for releasing said stop device, a latch for holding said stop device in released position, a spring interposed between said members and freely and bodily movable therewith, said spring being arranged to restore said connections to normal position to release said latch.

HARRY W. BARSON.

Witnesses:
ELEANOR HAGEMOW,
J. G. ANDERSON.